INVENTOR
Robert J. Brown
BY *James R. Hulen*
ATTORNEY

INVENTOR
Robert J. Brown
BY James R. Hulen
ATTORNEY

INVENTOR.
Robert J. Brown
BY James R. Hulen
ATTORNEY

INVENTOR.
Robert J. Brown
BY James R. Hulen
ATTORNEY

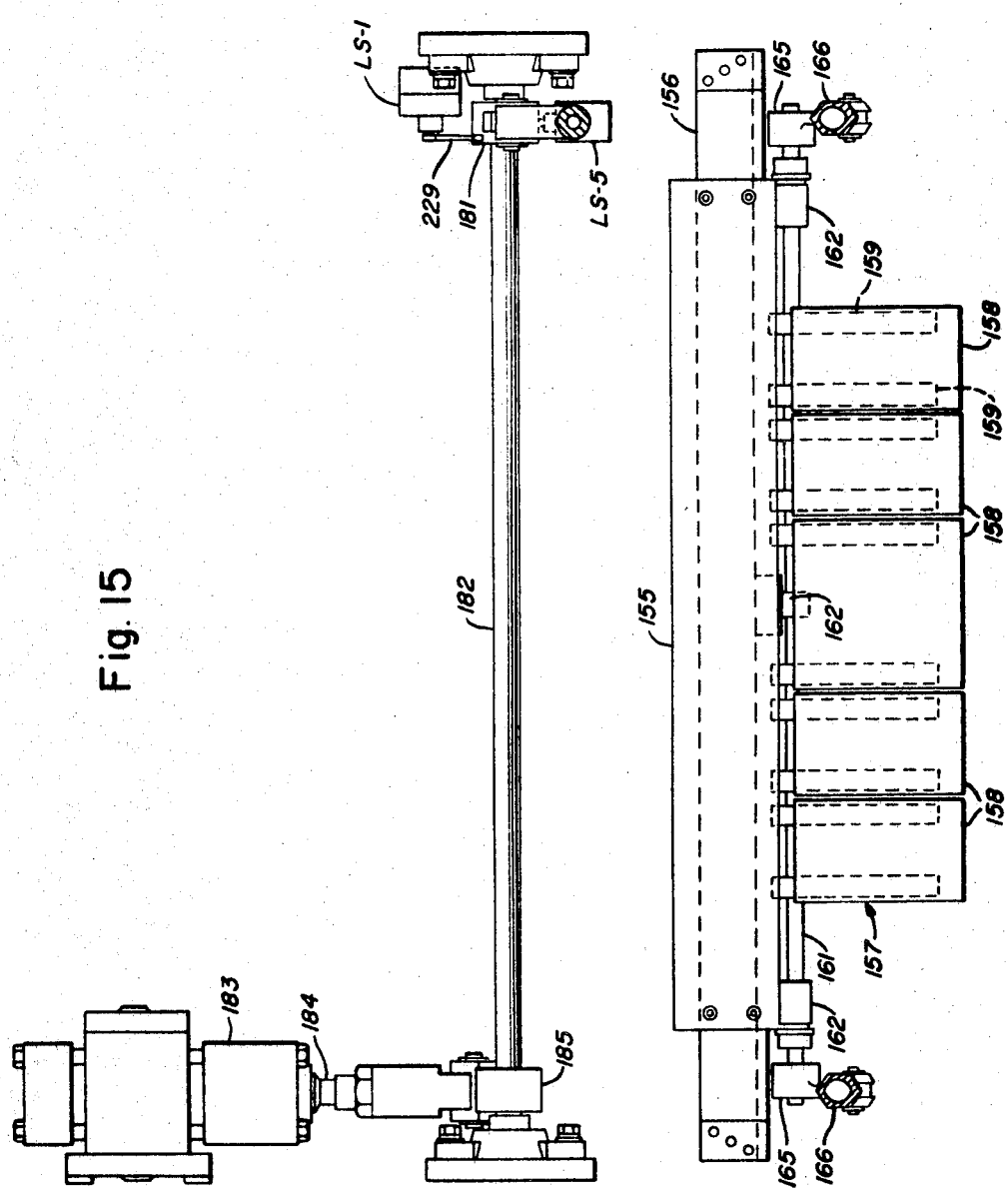

July 16, 1968 R. J. BROWN 3,393,112
TIRE BUILDING APPARATUS AND METHOD
Filed Jan. 17, 1964 14 Sheets-Sheet 10
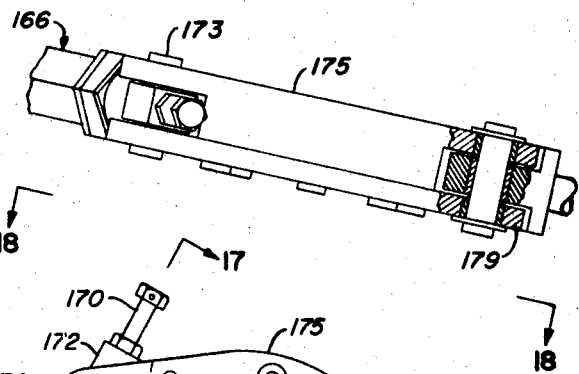
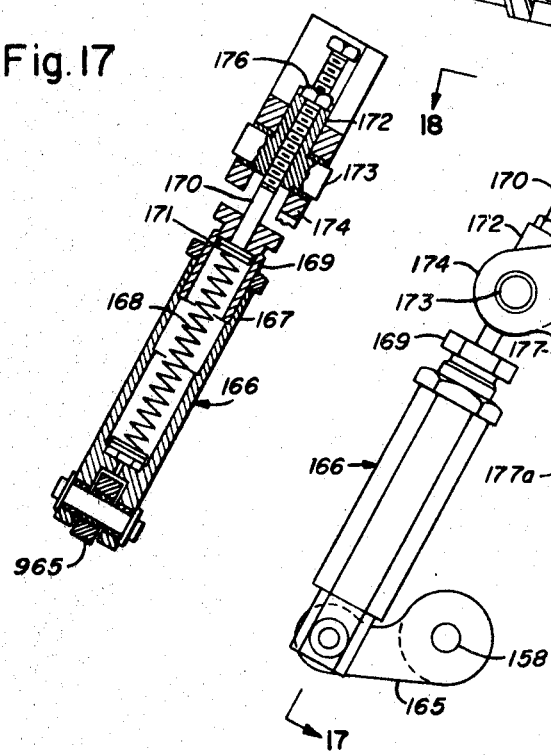
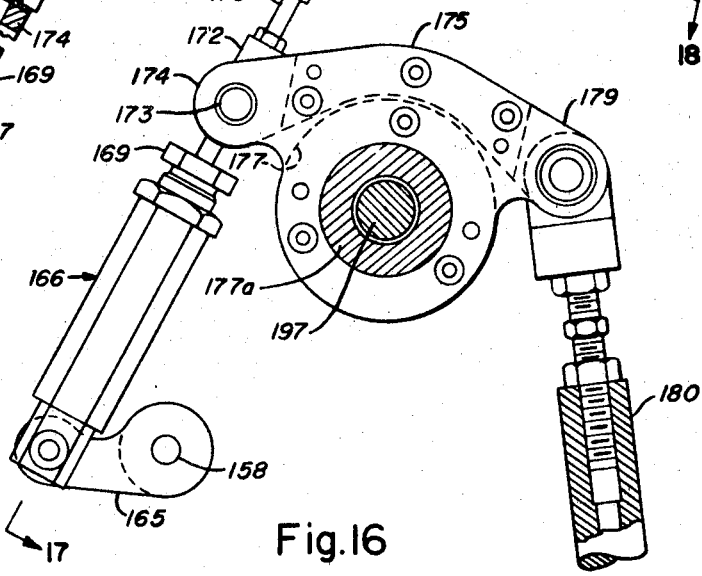
INVENTOR.
Robert J. Brown
BY James A. Hulen
ATTORNEY July 16, 1968  R. J. BROWN  3,393,112
TIRE BUILDING APPARATUS AND METHOD
Filed Jan. 17, 1964  14 Sheets-Sheet 11

INVENTOR.
Robert J. Brown
BY *James R. Hulen*
ATTORNEY

July 16, 1968 R. J. BROWN 3,393,112
TIRE BUILDING APPARATUS AND METHOD
Filed Jan. 17, 1964 14 Sheets-Sheet 12
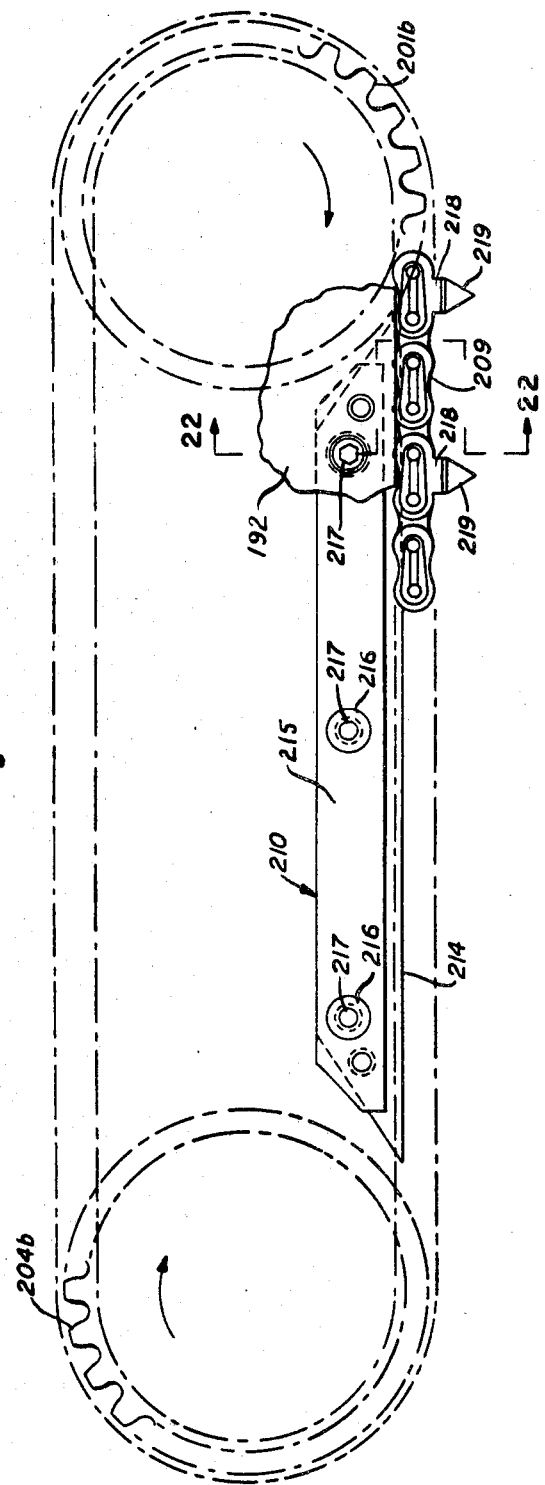
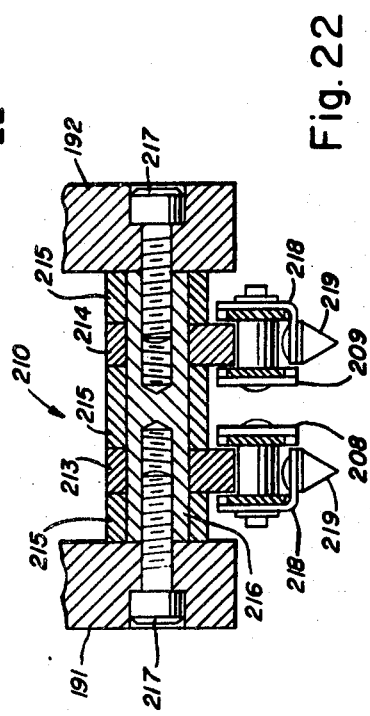
INVENTOR.
Robert J. Brown
BY James R. Hulen
ATTORNEY July 16, 1968  R. J. BROWN  3,393,112
TIRE BUILDING APPARATUS AND METHOD
Filed Jan. 17, 1964  14 Sheets-Sheet 13
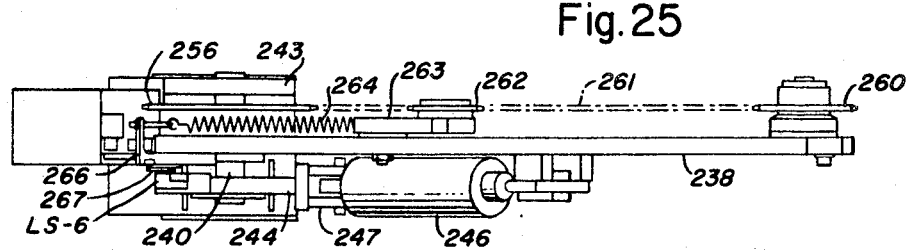
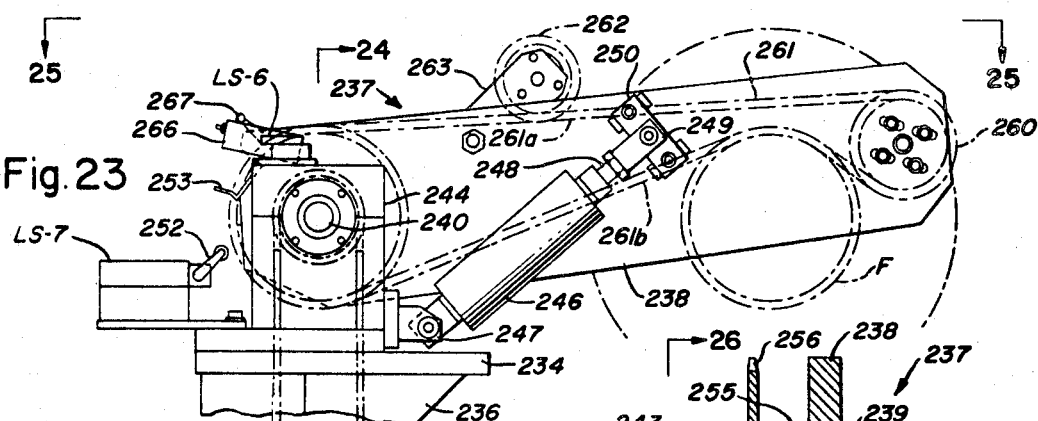
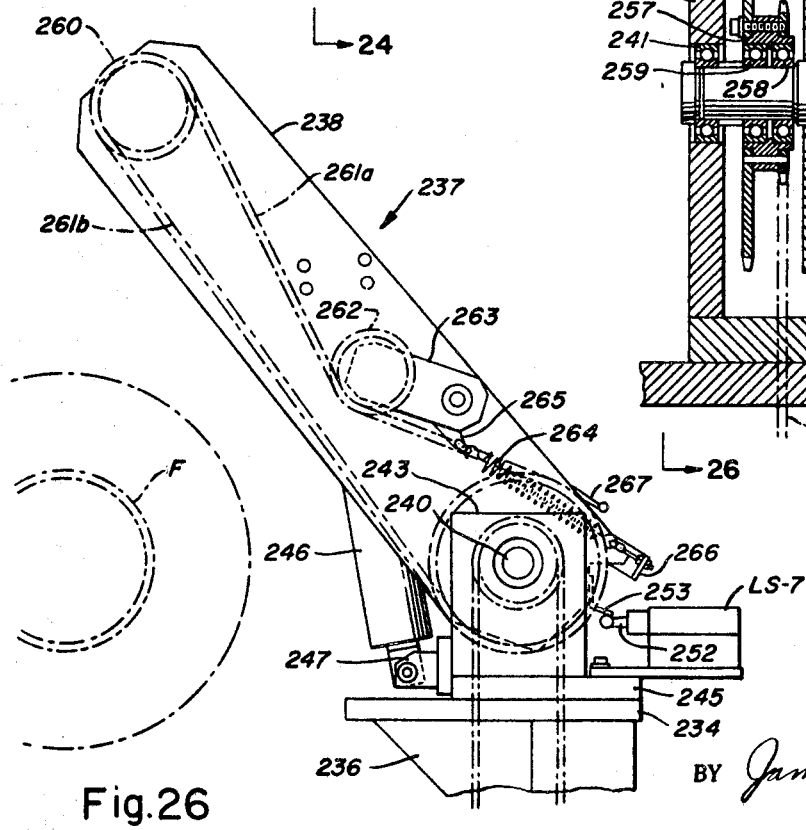
INVENTOR.
Robert J. Brown
BY James R. Hulen
ATTORNEY

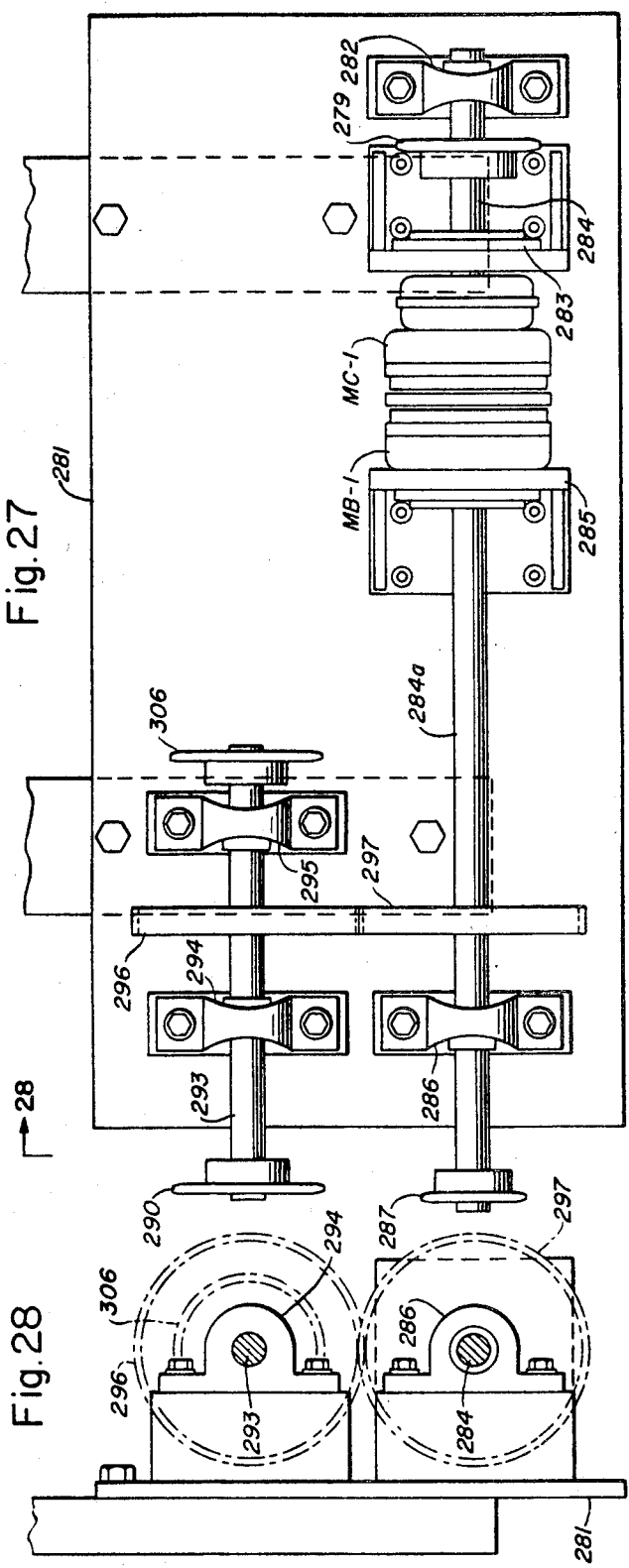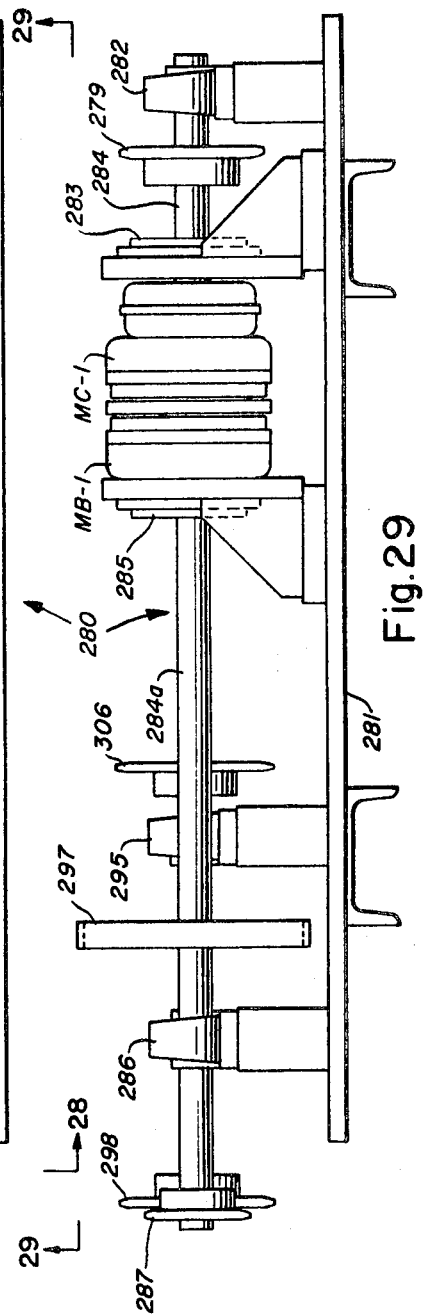

United States Patent Office 3,393,112
Patented July 16, 1968

3,393,112
TIRE BUILDING APPARATUS AND METHOD
Robert J. Brown, Wayne, N.J., assignor to Uniroyal, Inc.,
a corporation of New Jersey
Filed Jan. 17, 1964, Ser. No. 338,383
5 Claims. (Cl. 156—405)

ABSTRACT OF THE DISCLOSURE

Apparatus for accurately applying a tread to a rotatably mounted tire building drum comprising an endless conveyor belt for delivering the tread to a point adjacent the drum, an air cushion for supporting a portion of the tread above the belt to reduce the surface contact between the tread and the belt, and aligning means mounted above the belt and engageable with the tread for moving the tread into transverse alignment with the drum.

---

Figure 1:
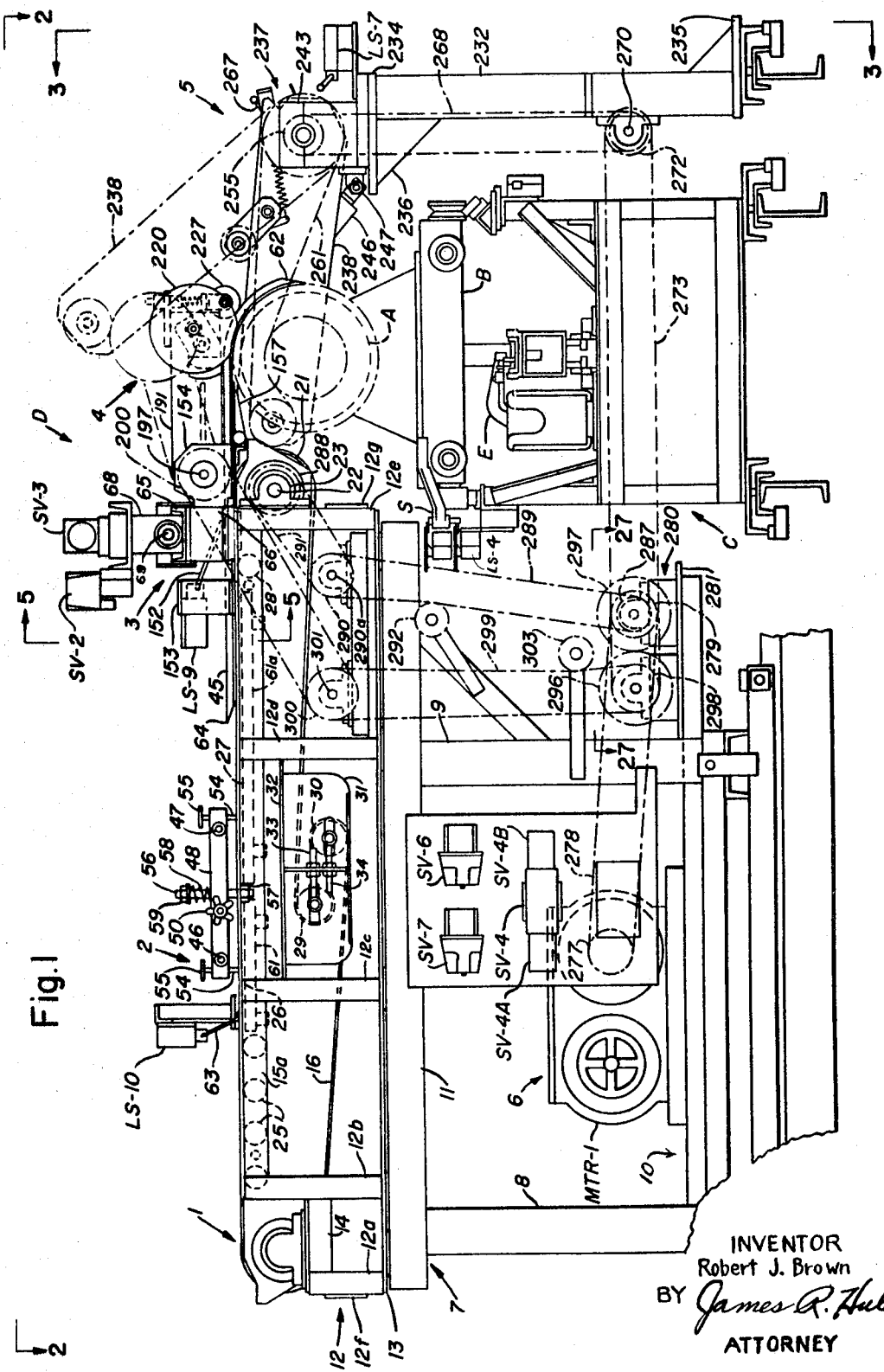

This invention relates to an apparatus and method for building tires. More particularly, the invention relates to an apparatus and method for accurately aligning a tread relative to a tire building drum and for applying the aligned tread to the drum.

In conventional tire building methods the tire carcass is built up on a rotatably mounted drum by first applying carcass plies and in a subsequent operation a tread is delivered to the drum by a conveyor or other means and wound thereon. To assure uniform tire quality it is necessary to provide means for transversely aligning the tread, with respect to the drum center line, prior to the application of the tread to the drum.

One such aligning means comprises the use of centering rollers or wheels that are located at a predetermined position on either side of the conveying means. These wheels are adapted to contact the tread shoulders as the tread passes therebetween and thereby move the tread into transverse alignment with the center line of the building drum. Because of the tacky quality of the uncured tread stock, the tread tends to adhere to the surface of the conveying means and much difficulty has been experienced in prior equipment in endeavoring to overcome this problem. A proposed solution to the above problem is shown in the United States patent to Bosomworth No. 3,038,524, issued on June 12, 1962, wherein a series of downstream rollers are mounted for lateral movement relative to the building drum. In the above structure it is the conveying means itself that moves, thus making it necessary to provide complicated mountings for the conveying rollers. Furthermore, because the conveying rollers are spring biased toward the center line of the conveyor, they tend to oppose the alignment of the tread.

Accordingly, it is an object of this invention to provide a new and improved tread aligning and applying apparatus and method.

A further object is to provide a tread applying apparatus and method for rapidly and accurately aligning a tread transversely of the center line of a tire building drum.

A still further object of this invention is to provide a new and improved apparatus and method for transversely aligning a tread on an endless moving conveyor.

Another object is to provide an apparatus for greatly reducing the frictional contact between a tread and a conveyor so that the tread may be moved transversely of the conveyor.

These and other objects are accomplished in accordance with this invention which comprises a conveying means for delivering a tread to a point adjacent a tire building drum; anti-friction means interposed between a portion of the tread and the conveying means; and aligning means mounted above the conveying means and engageable with the tread for moving the tread into transverse alignment with the drum.

For a better understanding of the present invention together with other and further objects thereof, reference is made to the following description, taken in connection with the accompanying drawings, and its scope will be pointed out in the appended claims.

Figure 2:
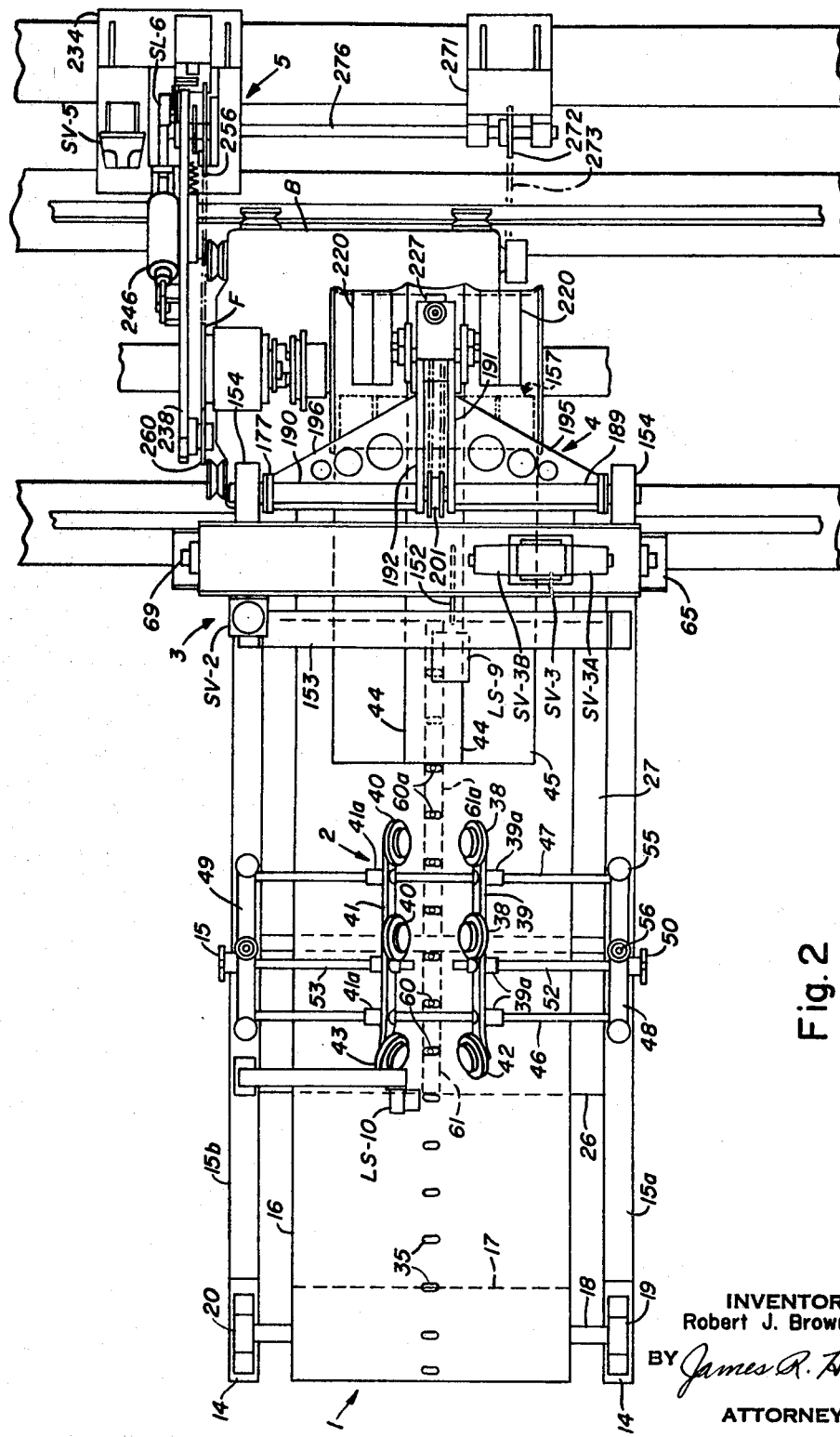
Figure 3:
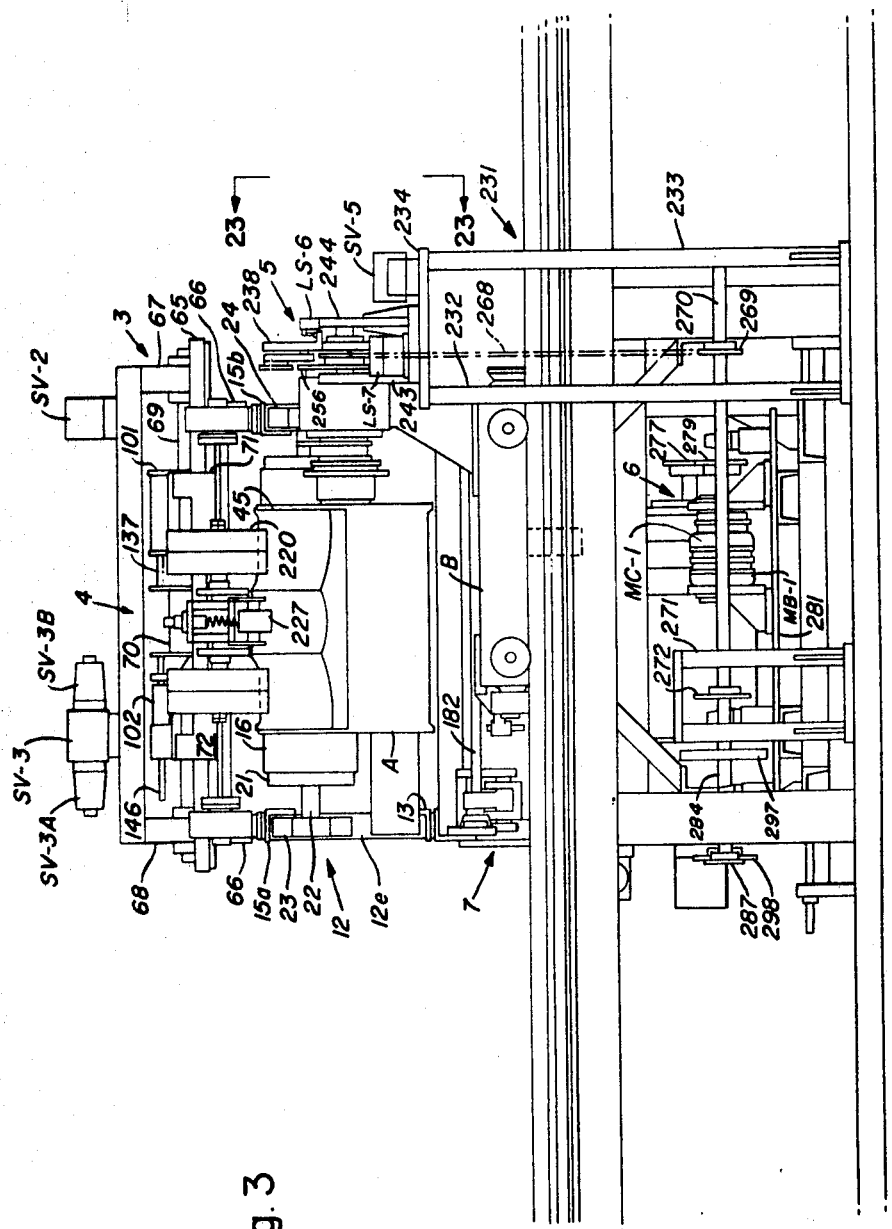
Figure 4:
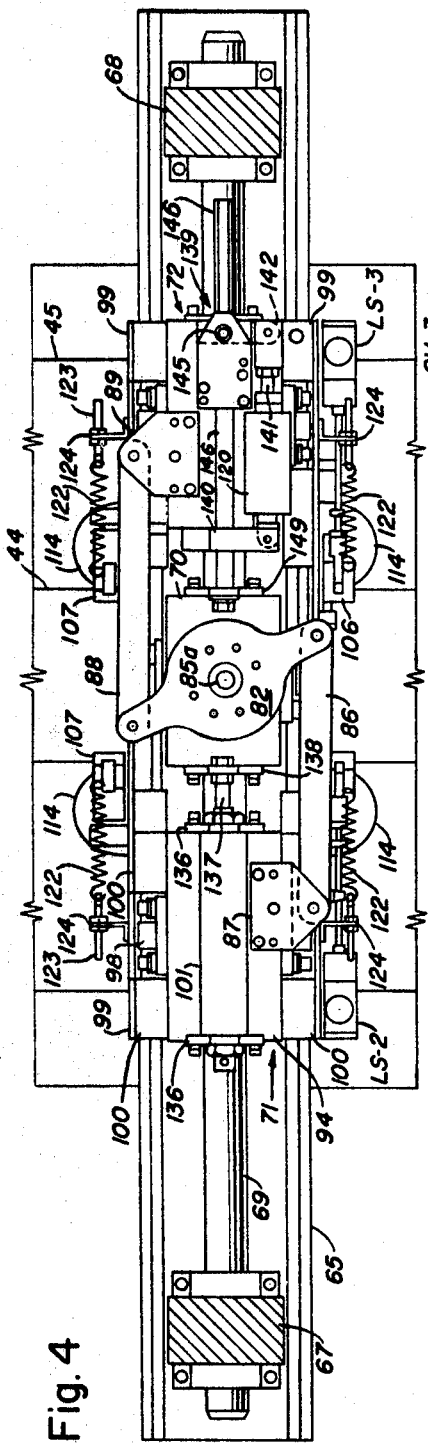
Figure 5:
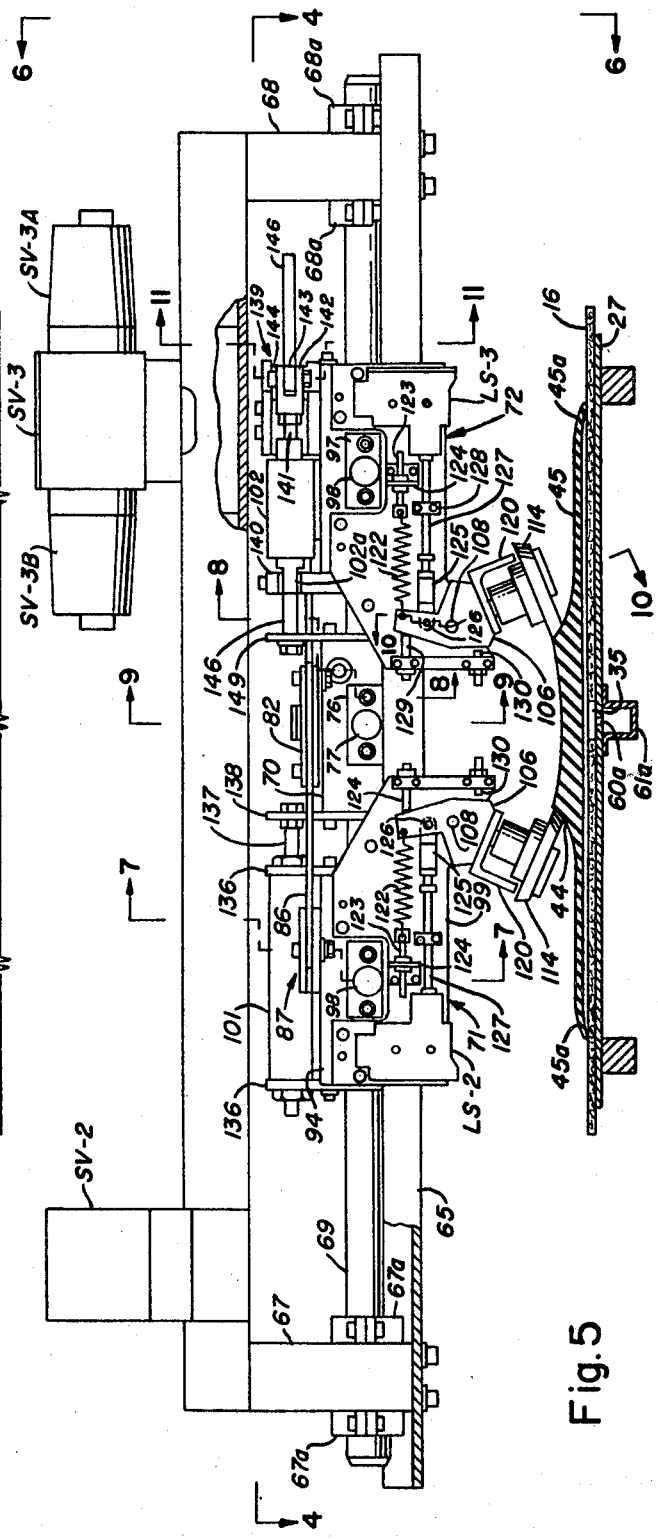
Figure 6:
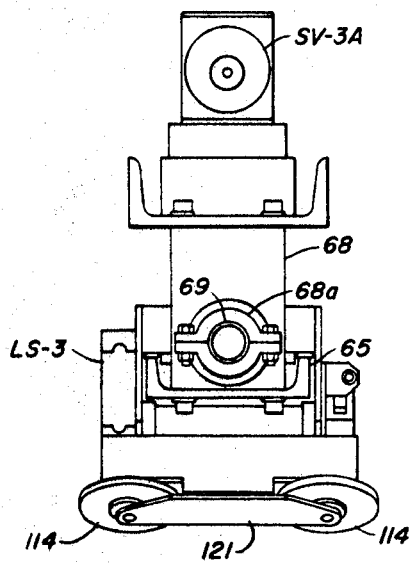
Figure 7:
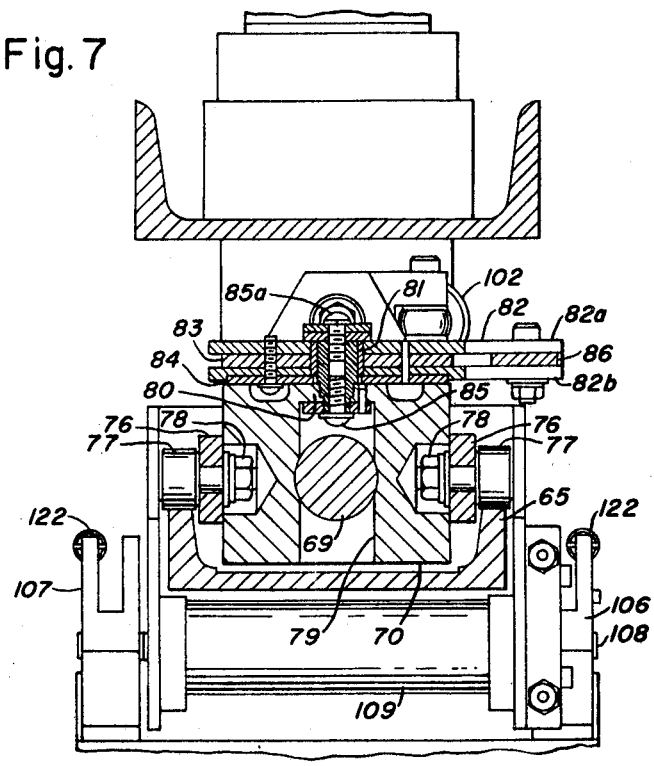
Figure 8:
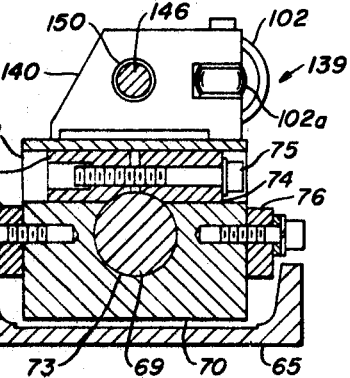
Figure 9:
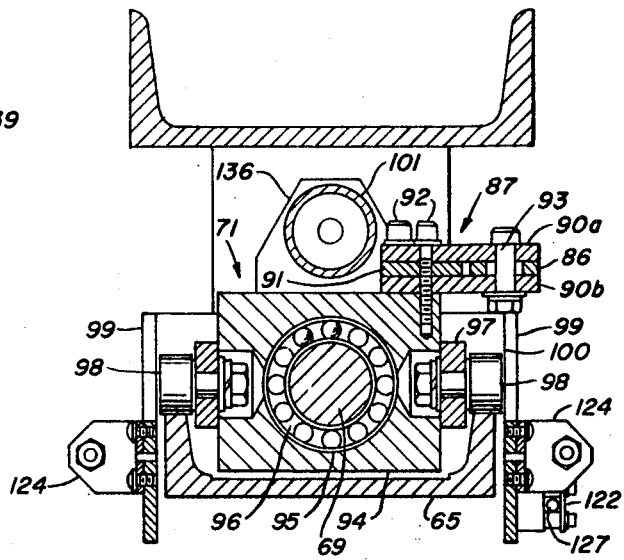
Figure 10:
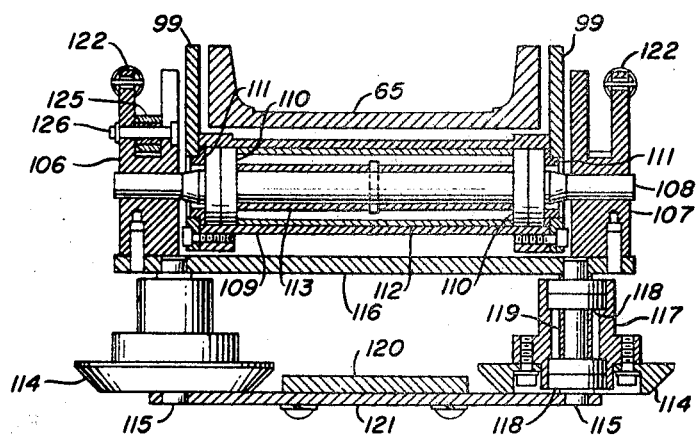
Figure 11:
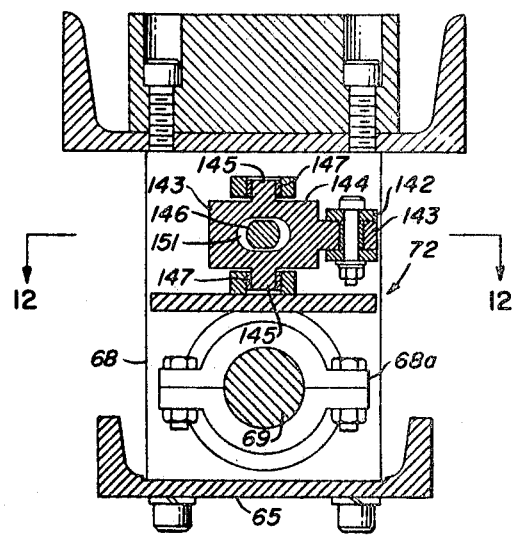
Figure 12:
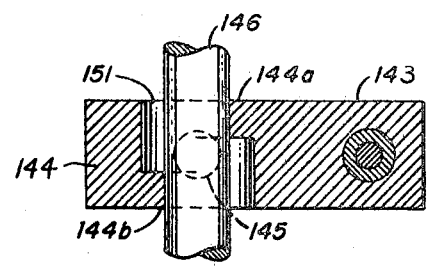
Figure 13:
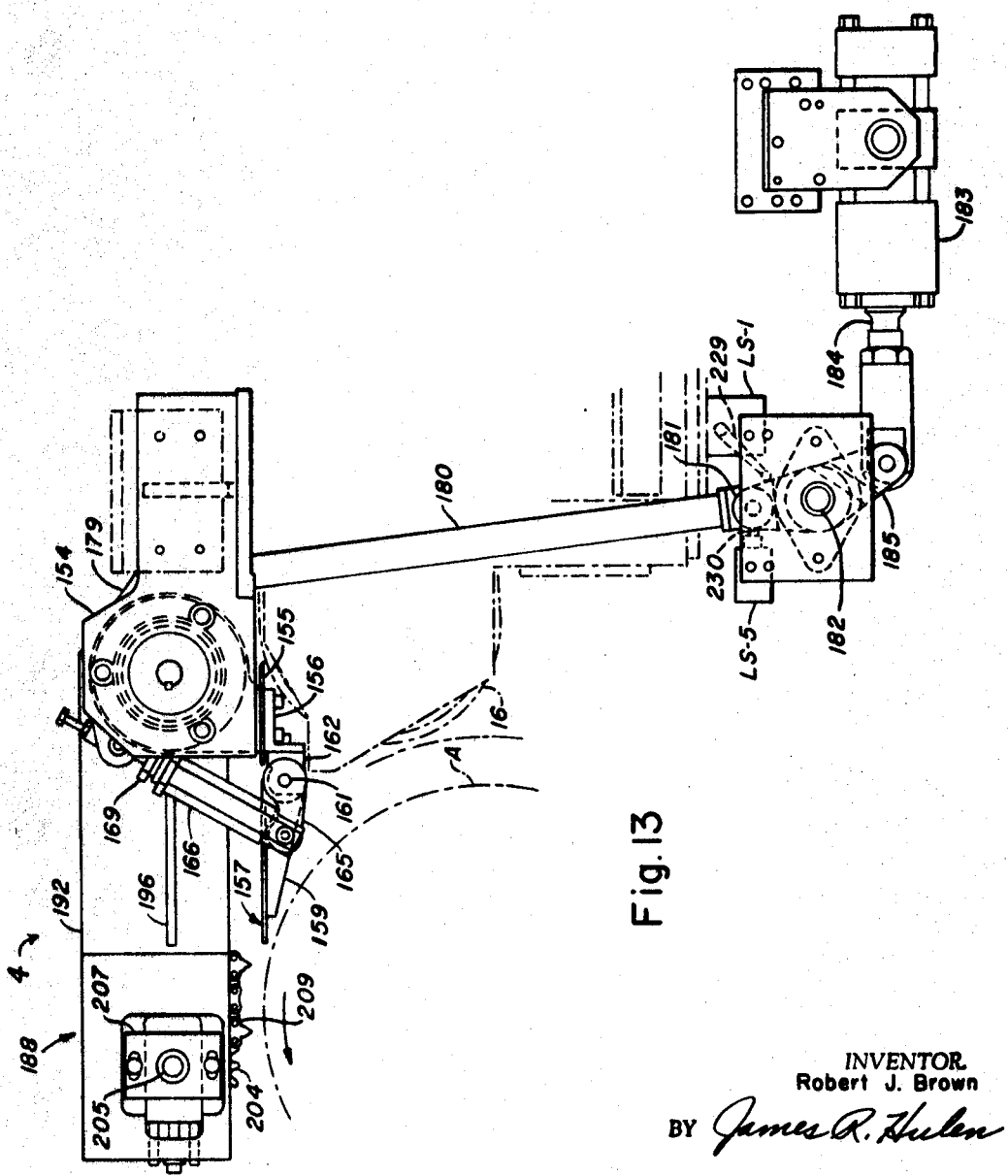
Figure 14:
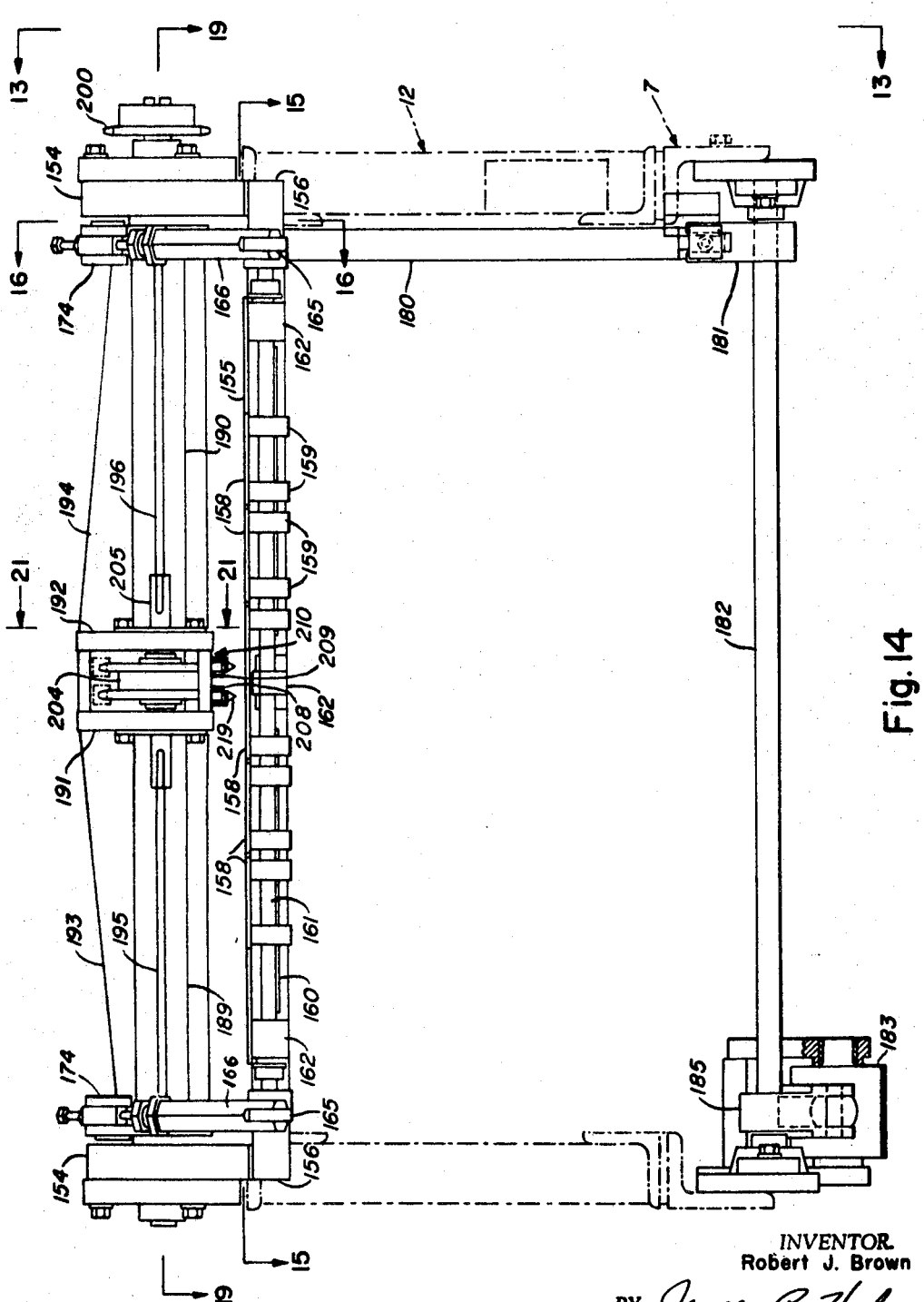
Figure 20:
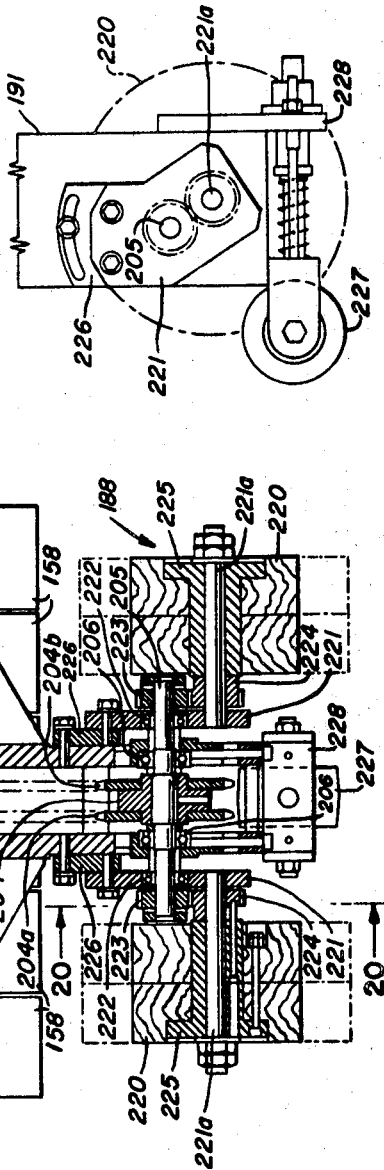
Figure 19:
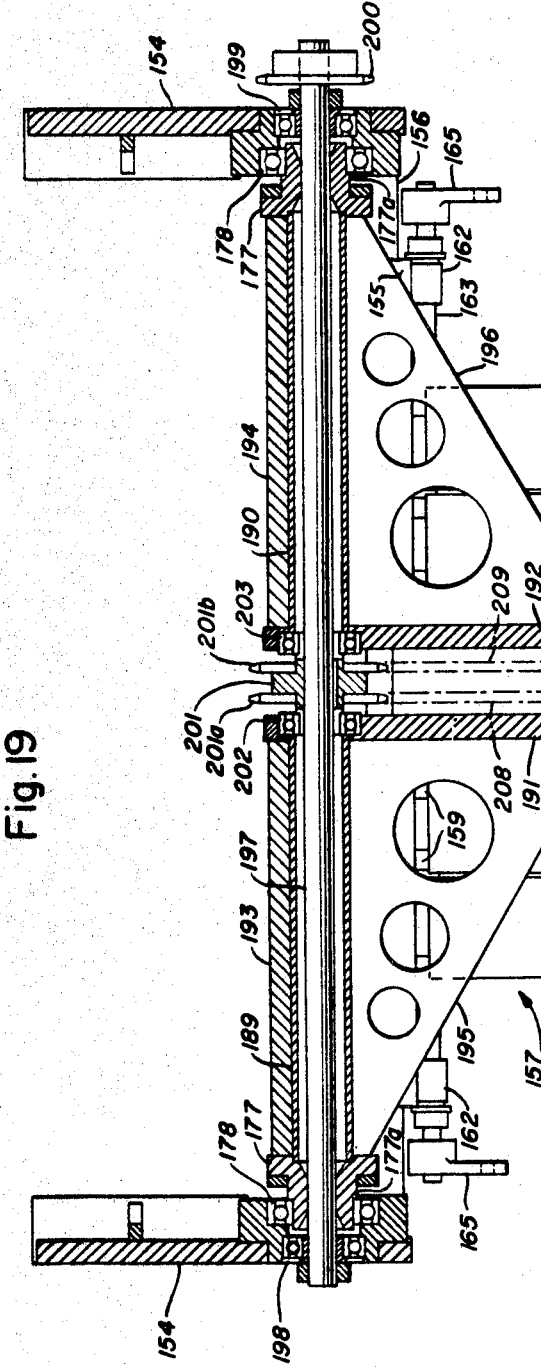

Referring now to the drawings:
FIG. 1 is a side elevational view of a tread applying apparatus embodying the invention;
FIG. 2 is a plan view of the tread applying apparatus, taken along the line 2—2 of FIG. 1;
FIG. 3 is an end elevational view of the tread applying apparatus, taken along the line 3—3 of FIG. 1;
FIG. 4 is a sectional plan view of a tread centering means utilized in the tread applying apparatus, taken along the line 4—4 of FIG. 5;
FIG. 5 is an enlarged sectional elevational view of the tread centering means, with parts broken away for clarity, taken along the line 5—5 of FIG. 1;
FIG. 6 is an end elevational view of the tread centering means, taken along the line 6—6 of FIG. 5;
FIG. 7 is an enlarged sectional elevational view, taken along the line 7—7 of FIG. 5;
FIG. 8 is an enlarged sectional elevational view, taken along the line 8—8 of FIG. 5;
FIG. 9 is an enlarged sectional elevational view, taken along the line 9—9 of FIG. 5;
FIG. 10 is an enlarged sectional elevational view, taken along the line 10—10 of FIG. 5;
FIG. 11 is an enlarged sectional elevational view, taken along the line 11—11 of FIG. 5;
FIG. 12 is an enlarged sectional plan view, taken along the line 12—12 of FIG. 11;
FIG. 13 is a side elevational view, taken along the line 13—13 of FIG. 14;
FIG. 14 is an enlarged end elevational view of a tread advancing and stitching means used in the tread applying apparatus;
FIG. 15 is a sectional plan view, taken along the line 15—15 of FIG. 14;
FIG. 16 is an enlarged sectional elevational view, taken along the line 16—16 of FIG. 14;
FIG. 17 is a sectional elevational view, taken along the line 17—17 of FIG. 16;
FIG. 18 is a plan view, with parts broken away for clarity, taken along the line 18—18 of FIG. 16;
FIG. 19 is a sectional plan view, taken along the line 19—19 of FIG. 14;
FIG. 20 is a sectional elevational view, taken along the line 20—20 of FIG. 19;
FIG. 21 is an enlarged sectional elevational view, with parts broken away and omitted for clarity, taken along the line 21—21 of FIG. 14;
FIG. 22 is an enlarged sectional elevational view, taken along the line 22—22 of FIG. 21;
FIG. 23 is a side elevational view of a drum rotating means used in the tread applying apparatus, the drum rotating means being shown in one condition of operation as viewed along line 23—23 of FIG. 3;
FIG. 24 is an enlarged sectional elevational view, taken along the line 24—24 of FIG. 23;
FIG. 25 is a plan view of the drum rotating means, taken along the line 25—25 of FIG. 23;
FIG. 26 is a side elevational view, similar to FIG. 23, but showing the drum rotating means in a different condition of operation;
FIG. 27 is an enlarged plan view showing a portion of a drive motor means used in the tread applying apparatus;

FIG. 28 is a sectional elevational view, taken along the line 28—28 of FIG. 27; and FIG. 29 is an end elevational view, taken along the line 29—29 of FIG. 27.

The present invention is illustrated in combination with a tread applying apparatus that is described in detail in copending United States patent application Serial No. 338,326, now Patent No. 3,355,346, issued November 28, 1967, of Sheppard A. Black and John D. Heide filed concurrently herewith. The tread applying apparatus forms part of a continuous tire building apparatus, a portion of which is described herein for purposes of clarity.

Referring to FIG. 1, a tire building drum A is shown mounted for rotation on a drum carrier B. Carrier B is supported by conveyor C and locked in place adjacent the tread applying apparatus, shown generally at D, by a locking fork E. It will be assumed for purposes of this description that the tire carcass plies have previously been applied to drum A at another tire building station and that the drum is ready to receive a tread.

Referring to FIGS. 1 through 3, the tread applying apparatus comprises, generally, a conveying means 1 for delivering the tread to a point adjacent the building drum A, initial tread aligning means 2 for moving the tread into approximate transverse alignment with drum A, tread centering means 3 for receiving the approximately aligned tread and accurately centering and aligning this tread with respect to building drum A, tread advancing and stitching means 4 for moving the accurately aligned tread onto the carcass and lightly stitching the tread to the carcass, drum rotating means 5 for rotating the building drum in a clockwise direction, as viewed in FIG. 1, so that the tread will be applied to the entire peripheral surface of the carcass by tread advancing and stitching means 4, and drive motor means 6 for driving the various chain and sprocket drives of elements 1, 4 and 5.

Referring to FIG. 1, a main frame, shown generally at 7, is provided for supporting various of the elements of the tread applicator. Frame 7 comprises a rear pair of transversely spaced, vertical support members, one of which is shown at 8, and a front pair of transversely spaced, vertical support members, one of which is shown at 9. Members 8 and 9 are supported and held in position at their lower ends by a rectangular base structure, shown generally at 10, and, in turn, carry transversely spaced, longitudinal frame members, one of which is shown at 11, at their upper ends.

A sub-frame, shown generally at 12, is rigidly carried atop main frame 7. Sub-frame 12 includes a series of longitudinally spaced pairs of vertical support elements, one of each of which is shown at 12a, 12b, 12c, 12d and 12e. A cross brace 12f rigidly interconnects rear vertical support elements 12a, and a cross brace 12g rigidly interconnects front vertical support elements 12e. Also, a pair of transversely spaced longitudinal members, one of which is shown at 13, rigidly interconnects the lower ends of elements 12a through 12e; a pair of transversely spaced, longitudinal members, one of which is shown at 14, rigidly connect the tops of elements 12a with the centers of elements 12b; and, a pair of transversely spaced, longitudinal members 15a and 15b (FIG. 2), rigidly connects the tops of respective ones of the pairs of elements 12b through 12e.

Referring to FIGS. 1 through 3, an endless conveyor belt 16 is movably supported on sub-frame 12. The upstream end of belt 16 (left side as viewed in FIGS. 1 and 2), passes around a roller 17 carried by a shaft 18 that is rotatably supported in suitable bearings 19 and 20. The downstream end of conveyor 16 passes around a roller 21 carried by a shaft 22 which is rotatably supported in bearings 23 and 24. The upper level of belt 16 is supported intermediate rollers 17 and 21 by a series of transverse rollers 25, a transverse plate member 26, a second transverse plate member 27 and a roller 28. The lower reach of belt 16 is trained around tensioning rollers 29 and 30 which are rotatably supported between two transversely spaced depending plate members 31 supported between vertical support elements 12c and 12d by brackets 32. Tension adjusting screws 33 and 34 are provided at each end of rollers 29 and 30, respectively, and provide means for adjusting the spacing between rollers 29 and 30 to maintain a predetermined tension in belt 16.

Conveyor belt 16 is provided along its entire length at approximately its center line with a series of longitudinally spaced substantially elliptically shaped apertures 35, the function of which will be described more fully below.

The initial tread aligning means 2 (see FIG. 2) is positioned directly above conveyor belt 16 and bolted at each of its sides to the upper flanges of longitudinal support members 15a and 15b. Aligning wheels 38 are supported for rotation on a bar 39 which runs substantially parallel with the center line of conveyor belt 16 and is spaced on one side of said center line, while tread aligning wheels 40 are supported for rotation on a similar bar 41 on the other side of the center line. Wheels 42 and 43 are angled outwardly toward the upstream end of conveyor 16 to provide a "funnel" by which the buttress portions of shoulders 44 of tread 45 may be directed to approximately the center line of belt 16. Bars 39 and 41 are fixed adjacent their ends to sleeves 39a and 41a, respectively, and the sleeves are mounted for sliding movement on transverse bars 46 and 47 which are fixed at their ends to longitudinal support bars 48 and 49.

The transverse spacing between wheels 38 and 40 may be adjusted by turning handwheels 50 and 51 which are journaled in bars 48 and 49, respectively, and have threaded connections with shafts 52 and 53, respectively. The inner end of shaft 52 is rigidly connected to bar 39. Accordingly, when handwheel 50 is rotated shaft 52 moves and causes bar 39 to slide on transverse bars 46 and 47. Similar considerations apply with respect to handwheel 51 and bar 41. Longitudinal bar 48 is vertically spaced from support member 15a by threaded pins 54 which may be adjusted upwardly or downwardly by turning knobs 55. Bar 49 is similarly spaced from member 15b and similarly adjusted. To prevent the aligning assembly from moving upwardly, a bolt 56 is passed through bar 48 and support member 15a and is bolted on the underside of support member 15a by nut 57. A coiled compression spring 58 encircles bolt 56 above bar 48 and is held thereagainst by a washer and nut 59. Consequently, any upward movement of aligning means 2 will be resisted by spring 58. A similar spring means is provided on the other side of the assembly so that the assembly is essentially symmetrical with respect to the center line of conveyor 16.

Plate 26, which supports conveyor belt 16 at the initial aligning means, has a series of closely spaced perforations 60 extending longitudinally of said plate substantially on the center line of conveyor belt 16. The aforementioned belt apertures 35 uncover various of the perforations 60 as belt 16 passes over plate 26. An air chamber forming channel 61 is welded to the underside of plate 26 and extends along the center line of belt 16 in register with perforations 60. A similar air chamber forming channel 61a is welded to the underside of plate 27 and is in alignment with perforations 60a which extend through plate 27. Referring to FIG. 5, this cross-sectional view shows the general arrangement of plate 27 and channel 61a, and the perforation 60a in alignment with aperture 35 of belt 16. Channels 61 and 61a are provided with air conduit fittings (not shown), the function of which will be described more fully hereinbelow.

In the operation of the initial tread aligning means, a tread 45 is manually placed on the upstream end of conveyor 16. As the conveyor moves the tread downstream the leading edge 62 of tread 45 contacts a switch actuating pin 63, which extends downwardly adjacent the upper surface of conveyor 16, and moves the pin upwardly to thereby actuate limit switch LS-10. The electrical, pneumatic, and hydraulic circuitry for the tread applicator described in this application has been described in detail in the aforementioned copending application Ser. No. 338,326 and will, therefore, not be repeated herein. The actuation of limit switch LS-10 electrically signals solenoid valve SV-7 that thread 45 is positioned over plate 26. Solenoid valve SV-7 controls the flow of pressurized air to channel 61 from a source not shown. Suitable conduits (not shown) interconnect solenoid valve SV-7 with an air conduit fitting in channel 61. Pressurized air fills channel 61 and passes through perforations 60 in plate 26 and apertures 35 in belt 16 to provide an air cushion or anti-friction air bearing for tread 45 as the tread passes downstream. Since only the lateral edges 45a of the tread remain in contact with the conveyor when the air cushion is on (see FIG. 5), any necessary initial lateral aligning of the tread encounters little resistance due to frictional contact between the flat undersurface of tread 45, which is very tacky, and the upper surface of conveyor 16. Accordingly, initial approximate lateral alignment of the tread will be accomplished by initial aligning means 2.

As tread 45 continues its downstream movement trailing edge 64 moves from under actuating pin 63 and the pin, which is spring biased, returns to its original position adjacent the upper surface of conveyor belt 16. This deactuates limit switch LS-10 which in turn, de-energizes solenoid valve SV-7 to discontinue the flow of pressurized air to channel 61 and remove the air cushion from the trailing edge of tread 45.

Referring to FIGS. 1 to 5, and particularly to FIG. 3, the tread centering means shown generally at 3 is supported directly above the downstream end of conveyor 16 by a transverse U-shaped channel 65 which is in turn supported on sub-frame 12 by brackets 66.

Referring to FIG. 5, spaced blocks 67 and 68 are securely bolted to each end of channel 65 and support a guide rod 69 which is held against axial movement by collars 67a and 68a. Guide rod 69 provides a support for stationary centering block 70 and movable wheel assemblies, shown generally at 71 and 72. Referring to FIGS. 7 and 8, centering block 70 is provided with a central horizontal opening 73 (FIG. 8) through which guide rod 69 passes. A transverse opening 73a extends through the top portion of block 70 and the block is held against axial movement relative to rod 69 by the insertion of wedge elements 74 into each side of said opening. Each wedge element 74 contacts a portion of rod 69 and the wedge elements are held in place by a bolt 75. A plate 76 is securely bolted to each side of block 70 and each plate rotatably supports a roller 77 (FIG. 7) which is secured to plate 76 by bolt 78. Rollers 77 are in rolling contact with the upper portions of U-shaped channel 65 and prevent any rotational movement of block 70 about guide rod 69. If it is desired to change the axial position of block 70 relative to rod 69 it is only necessary to loosen bolt 75 and wedges 74 in transverse slot 73a, roll the block to the proper position, and re-tighten the wedges and bolt.

A vertical aperture 79 extends through the center of block 70 and has a stepped flange 80 extending inwardly at the upper end thereof. A sleeve 81, having stepped portions corresponding to flange 80, is seated in said flange to provide a bearing surface about which a crank assembly 82 is free to pivot. Crank 82 is provided with upper and lower plates 82a and 82b which are separated by spacer plate 83. A plate 84, fastened to the lower surface of crank 82, provides a sliding or bearing surface between crank 82 and the upper surface of block 70, and the entire assembly is rotatably fastened to block 70 by set screws 85 and 85a.

A link 86 is pivotally connected at one of its ends to one end of crank 82, between plates 82a and 82b, and at its other end to a bracket 87 which is securely bolted to wheel assembly 71 (see FIG. 4). A similar link 88 is pivotally connected at one of its ends to the other end of crank 82 and at its other end to bracket 89 which is securely bolted to wheel assembly 72. Referring to FIG. 9, bracket 87 comprises plates 90a and 90b which are spaced by plate 91 and firmly secured to wheel assembly 71 by screws 92. Pivot screw 93 extends through spaced plates 90a and 90b and provides a pivotal connection for link 86.

Wheel assembly block 94 of wheel assembly 71 (see FIG. 9) is constructed in much the same manner as centering block 70. Since block 94 must move axially of guide rod 69, a central horizontal passageway 95, which passes through the center of block 94, is provided with ball bearings 96 to facilitate movement of block 94 on guide rod 69. A side plate 97 is secured to each side of block 94 and each plate rotatably carries a roller 98, the rollers being positioned to roll on U-shaped channel 65. An elongated side plate 99 is secured to each side of block 94 and the plates are spaced therefrom by blocks 100 so that they extend transversely beyond and vertically below block 94 (see FIG. 5).

At this time it should be pointed out that wheel assemblies 71 and 72 are substantially identical and thus form a symmetrical unit with regard to centering block 70. Thus, like numbers will be used for like parts in the various views for the two assemblies. The only difference between said assemblies is the placement of wheel centering cylinder 101 atop assembly 71 and wheel locking cylinder 102 atop assembly 72. The function and structure of each of these cylinders will be described in greater detail below.

Referring to FIG. 10, side plates 99 of wheel assembly 72 are shown extending below U-shaped channel 65. Wheel mounting blocks 106 and 107 are pivotally supported on shaft 108, which extends through apertures in the lower end of side plates 99 and is journaled in a housing 109 secured by screws between side plates 99. Bearings 110 are spaced from side plates 99 by collars 111 and are spaced from each other by an internal sleeve 112, positioned adjacent the internal surface of housing 109, and by an internal sleeve 113 which encircles shaft 108. Centering wheels 114 are rotatably supported on shafts 115 which are fixed at one end to cross plates 116 supported between wheel mounting blocks 106 and 107. Each wheel 114 is secured to a bearing housing 117 which is supported by suitable bearings 118 spaced on shaft 115 by sleeve 119. Flange 120 extends outwardly from cross plate 116 and provides a support for element 121 which supports the outer ends of shafts 115.

Wheel mounting blocks 106 and 107 are bifurcated at their upper ends and the outer arm of each block carries one end of a tension spring 122 which is fixed at its other end to pin 123 (FIG. 5) which is supported for axial adjustment by bracket 124 secured to side plate 99. Since tention springs 122 are fixed to the upper portion of wheel mounting blocks 106 and 107, the axial adjustment of pins 123 in brackets 124 will adjust the amount of tension which tends to pivot the wheel mounting blocks around shaft 108 towards the tread shoulders 44. Referring again to FIG. 10, wheel mounting block 106 pivotally supports between its upper bifurcated end a cam pin mounting 125 which is held in place by pivot pin 126. Cam pins 127 (FIG. 5) are held against vertical movement by brackets 128 and when wheel mounting blocks 106 and 107 are free to pivot, springs 122 bias cam pins 127 against the actuating buttons of limit switches LS-2 and LS-3. Appropriate stops 129 and 130 are secured to wheel assemblies 71 and 72 and positioned to limit the pivotal movement of the wheel mounting blocks.

Power cylinder 101, which accomplishes the movement of wheel assemblies 71 and 72 inwardly and outwardly, will now be described. Referring to FIGS. 4, 5 and 9, cylinder 101 is supported above block 94 between brackets 136 which are secured to opposite ends of block 94. Cylinder 101 has a double acting piston (not shown) which carries one end of piston rod 137. The other end of piston rod 137 is supported against axial movement by bracket 138 secured to centering block 70. Since centering block 70 is fixed against axial movement on guide rod 69, and since wheel assemblies 71 and 72 are free to move axially on guide rod 69, it will be apparent that the introduction of pressurized fluid to the left side of cylinder 101, as viewed in FIG. 5, will force wheel assembly 71 to move to the left and, through link 86, crank 82, and link 88, will force wheel assembly 72 to move to the right.

Likewise, if pressurized fluid is introduced to the right side of cylinder 101, the cylinder will be forced to the right, causing wheel assembly 71 to be moved to the right and wheel assembly 72 to be moved to the left.

A wheel assembly locking mechanism 139 will now be described in detail. Referring to FIGS. 4, 5, 8, 11 and 12, bifurcated support block 140 is secured to one end of wheel assembly 72. Power cylinder 102 is pivotally supported at one end 102a to block 140. A piston (not shown) is movably disposed in cylinder 102 and carries one end of a piston rod 141, the other end of which extends out of cylinder 102 and carries a yoke 142. Yoke 142 (FIG. 11) is pivotally connected to an arm 143 which extends outwardly from locking block 144. Locking block 144 has pivot pins 145 extending from its upper and lower surfaces which are journaled in suitable bearings 147 secured to the upper surface of wheel assembly 72. A wheel assembly locking rod 146 is secured against axial movement relative to centering block 70 by bracket 149 (FIGS. 4 and 5). Rod 146 passes through an aperture 150 (FIG. 8) in support block 140 and through an aperture 151 (FIG. 11), in wheel assembly locking block 144. Block 144 is provided with shoulders 144a and 144b (FIG. 12) extending inwardly into aperture 151 and having arcuate end faces complementary to rod 146. Thus, when piston rod 141 is extended from cylinder 102 it pivots locking block 144 in a counterclockwise direction, as viewed in FIG. 12, and forces shoulders 144a and 144b to clamp rod 146, thereby preventing further movement of wheel assemblies 71 and 72. On the other hand, when piston rod 141 is retracted into cylinder 102, block 144 pivots in a clockwise direction and releases the clamping action.

Referring to FIG. 1, as tread 45 continues its downstream movement from initial tread aligning means 2, leading edge 62 contacts a downwardly extending actuating pin 152 on limit switch LS-9 which is supported above conveyor 16 on transverse bracket 153. The continued downstream movement of tread 45 moves pin 152 upwardly to actuate the limit switch. The actuation of limit switch LS-9 provides an electrical signal which indicates that tread 45 is positioned over plate 27 and results in energization of the solenoid of valve SV-6. Solenoid valve SV-6 controls the flow of pressurized air to channel 61a from a source (not shown). Suitable conduits (not shown) interconnect solenoid valve SV-6 with an air conduit fitting in channel 61a. Pressurized air passes through perforations 60a (FIG. 5) in plate 27 and through apertures 35 in belt 16 to again provide an air cushion for tread 45 in much the same manner as the upstream air cushion for the initial tread aligning means. The actuation of limit switch LS-9 also results in an electrical signal which halts the downstream movement of conveyor belt 16 with the leading portion of tread 45 positioned between centering wheels 114.

A solenoid valve SV-3 is supported above the tread centering means. This solenoid valve has actuating solenoids SV-3A and SV-3B that are employed in the operation of power cylinder 101. The actuation of limit switch LS-9 energizes solenoid SV-3A which controls the flow of pressurized fluid to the right side of cylinder 101 through suitable conduits (not shown). As stated above, the introduction of fluid into the right side of cylinder 101 forces this cylinder to the right, as viewed in FIG. 5, thereby moving wheel assembly 71 to the right and wheel assembly 72 to the left. The movement of the wheel assemblies inwardly brings centering wheels 114 into contact with the buttress 44 of tread 45. If tread 45 is off-center, one set of wheels will contact the tread first and move the tread laterally with respect to conveyor belt 16. As both sets of wheels contact the buttress their inward movement is halted and the continued movement of assemblies 71 and 72 causes wheel mounting blocks 106 and 107 to pivot against the force of springs 122. As a result of this, cam pins 127 de-actuate limit switches LS-2 and LS-3. The amount of movement of cams 127 necessary to de-actuate said limit switches is very slight. Accordingly, almost immediately after de-actuation of the limit switches, the wheel mounting blocks 106 and 107 come in contact with stops 129. Limit switches LS-2 and LS-3 provide an electrical signal indicative of the fact that the centering wheels 114 are in contact with tread buttress 44. Also, this signal results in actuation of the solenoid of valve SV-2. Solenoid valve SV-2 controls the flow of pressurized fluid to wheel locking cylinder 102. Suitable conduits (not shown) interconnect solenoid valve SV-2 with cylinder 102 and the actuation of this solenoid valve introduces fluid to the cylinder. Accordingly, piston rod 141 extends out of cylinder 102, thereby pivoting block 144 so as to clamp rod 146 and prevent any further movement of wheel assemblies 71 and 72. With the wheel assemblies thus locked in position and centering wheels 114 in contact with tread buttress 44, the tread will be accurately aligned and ready for application to the building drum. A time delay in the electrical system shuts off the downstream air cushion when the centering wheels have come together and have properly aligned the tread.

When the tire building drum is ready to receive the tread, the conveyor is again actuated to move the tread downstream and the downstream air cushion is again provided to support the center of the tread above the conveyor and permit the tread to move laterally across the conveyor belt as necessary to correct any error in its alignment as it enters the centering wheels. The centering wheels at this time are still in engagement with buttresses 44 to maintain the tread accurately aligned during the application operation. When the trailing edge 64 of tread 45 runs out from between centering wheels 114 and from under limit switch actuating pin 152, wheel mounting blocks 106 and 107 pivot under the force of springs 122 to force cam pins 127 to actuate limit switches LS-2 and LS-3 and pin 152 returns to its position adjacent the upper surface of conveyor 16 to de-actuate limit switch LS-9. The de-actuation of limit switch LS-9 provides an electrical signal indicative of the fact that the tread 45 is no longer positioned between centering wheels 114. It also results in the energization of valve solenoid SV-3B. Valve solenoid SV-3B controls the flow of pressurized fluid to the left side of cylinder 101 through suitable conduits (not shown). The passage of pressurized fluid into the left side of cylinder 101, as seen in FIG. 5, forces this cylinder to the left, thereby moving wheel assembly 71 to the left and wheel assembly 72 to the right. The tread centering means 3 is now in position to receive the next tread.

Referring to FIGS. 1 to 3 and 13 to 22, the details of the tread advancing and stitching means 4, which is employed in advancing the tread over the tire building drum and stitching the tread to the carcass thereon, will now be considered.

Referring to FIG. 1, the apparatus is shown generally at 4 in full lines in its down or operative position and in broken lines in its up or inactive position. The entire assembly 4 is supported over the downstream end of conveyor belt 16 by laterally spaced support blocks 154 which are secured to each side of subframe 12. As viewed in FIGS. 13 and 14, a tread supporting plate 155 is supported by a suitable transverse bracket 156 that is fixed to the bottom of blocks 154. Plate 155 is positioned to receive the tread 45 as it leaves the downstream end of conveyor belt 16. A tread supporting gate 157 extends downstream from plate 155 and is in horizontal alignment therewith when the gate is in its down position.

Gate 157 comprises a plurality of plate members 158 (FIGS. 14 and 15), each of which is mounted on a pair of brackets 159. Brackets 159, in turn, are keyed by means of a key 160 (FIG. 14), to a pivotable transverse rod 161. Rod 161 is pivotally supported at its ends and at its center by suitable bearings 162 which are fastened to bracket 156.

Brackets 159, although keyed to transverse rod 161, may be manually moved longitudinally of rod 161 in order to change the overall width of gate 157.

On each end of rod 161 is secured a crank arm 165 which is pivotally connected at its free end to the bifurcated end of connecting rod assembly 166. Referring to FIGS. 16 and 18, connecting rod 166 includes a hollowed member 167, a compression spring 168 disposed therein and retained therein by threaded retaining cap 169. Cap 169 has an aperture through which bolt 170 passes, the bolt 170 being held within retaining cap 169 by head member 171 which is in contact with the upper end of compression spring 168. The upper end of bolt 170 is threaded to receive threaded collar 172 which has pivot pins 173 integral therewith. Pins 173 provide a pivotal connection with the arm 174 of a crank 175. A lock nut 176 is provided on pin 170 to prevent accidental axial displacement of collar 172, relative to bolt 170. Crank 175 is secured to radially extending flange 177 (FIG. 19) on hub 177a which is rotatably mounted in support block 154 by suitable bearings 178.

Up to this point, the connecting rod 166 and crank mechanism connected to the left end of rod 161, as viewed in FIG. 14, is identical to the connecting rod 166 and crank mechanism appearing on the right end of said rod. To provide a means for pivoting cranks 175 an additional arm 179 (FIG. 16) extends outwardly from one of the cranks 175 and is connected to the upper end of connecting rod 180. Rod 180 is pivotally connected to one end of link 181 (see FIGS. 13, 14 and 15) which is fixed at its other end to rotatably mounted shaft 182. Shaft 182 is journaled at its ends in suitable bearings secured to each side of frame 7. A gate raising and lowering power cylinder 183 is pivotally bracketed to frame 7 and has a piston (not shown) which carries one end of piston rod 184. Piston rod 184 is pivotally connected at its free end to link 185 fixed to transverse shaft 182.

The upward and downward movement of gate 157 is accomplished by the extension and retraction of piston rod 184 within cylinder 183. As shown in FIG. 13, gate 157 is in the down or operative position and piston 184 is retracted into cylinder 183. When it is desired to move gate 157 upwardly to an inactive position, piston rod 184 is extended to the left, as viewed in FIG. 13, thereby pivoting link 185, shaft 182 and link 181 in a clockwise direction and moving connecting rod 180 downwardly. This causes cranks 175 to pivot in a clockwise direction, thereby lifting the gate 157 by way of connecting rods 166 and crank arms 165.

Although conveyor 16 will deliver the tread to building drum A, a more positive means has been provided to insure proper alignment and stitching of the tread on the building drum. This means, shown generally at 188 in FIGS. 13 and 19, is pivotally supported between hubs 177a and secured thereto so that said means will be moved upwardly and downwardly by the same mechanism that operates gate 157. Two hollow supporting shafts 189 and 190 are supported at their outer ends by hubs 177a and are secured at their inner ends to spaced support beams 191 and 192 which extend outwardly from the downstream end of conveyor 16 and are substantially parallel to the center line of said conveyor. A pair of transverse support bars 193 and 194 and gussets 195 and 196 are also secured at their outer ends to hubs 177a and at their inner ends to support beams 191 and 192, respectively, to provide additional support.

A sprocket drive shaft 197 passes through hollow support shafts 189 and 190 and is supported in spaced support blocks 154 by bearings 198 and 199. A drive sprocket 200 is secured to one end of shaft 197 to provide means for rotating this shaft along with sprockets 201a and 201b, which are supported between beams 191 and 192 on hub 201 secured to shaft 197 and are mounted for rotation in suitable bearings 202 and 203.

It will thus be apparent that shaft 197 is free to rotate within hollow shafts 189 and 190, and the hollow shafts are in turn pivotally mounted within bearings 178. The assembly will thus be free to move upwardly and downwardly with respect to building drum A without affecting the rotational movement of shaft 197.

The outer or downstream ends of beams 191 and 192 rotatably carry a second pair of sprockets 204a and 204b which are supported on hub 204 secured to elongated shaft 205 which rotates in bearings 206. Bearings 206 are supported in adjustable blocks 207 (see FIG. 13) which provide means for adjusting the distance between hubs 201 and 204 to adjust the tension on chains 208 and 209 (FIG. 19) carried by sprockets 201 and 204.

Referring to FIGS. 21 and 22, a guide track shown generally at 210 is supported between the lower portions of beams 191 and 192 and supports and guides the lower level of chains 208 and 209 between sprockets 201 and 204. Spaced support beams 191 and 192 carry a pair of guide bars 213 and 214 therebetween which are spaced from each other and from the beams by spacer bars 215, and the entire assembly is secured together by transverse threaded pins 216 and set screws 217. As chains 208 and 209 pass around sprockets 201 in a clockwise direction, as viewed in FIG. 21, they come in contact with guide bars 213 and 214, respectively, and are supported by said bars against vertical upward movement along the entire distance from sprockets 201 to sprockets 204. Every other link on chains 208 and 209 carries an inwardly directed bracket 218 which supports a downwardly directed tooth 219.

When beams 191 and 192 are in the down or operative position and a tread is being applied to building drum A, suitable drive means, which will be described below, are provided to drive sprocket 200 (FIG. 19) which rotates shaft 197 to drive sprockets 201 and 204. The clockwise rotational movement of sprockets 201 and 204 will move the teeth 219 at the lower level of chains 208 and 209 to the left, as viewed in FIG. 21, and teeth 219 will press into the upper surface of the tread to provide a positive and accurate means for advancing the tread to the tire building drum.

A pair of round brushes 220 (FIG. 19) provide a means for smoothing and lightly stitching the tread sidewalls to the carcass while the tread is being applied to the carcass. Brushes 220 are supported for rotation relative to spaced plates 221 by means of shafts 221a affixed to the plates. Brushes 220 are driven from sprocket supporting shaft 205 which is rotatably supported in plates 221 by bearings 222. The extreme ends of shaft 205 carry gears 223 which mesh with pinions 224 journaled on brush supporting shafts 221a. Pinions 224, in turn, are keyed to the hubs 225 of brushes 220. Side plates 221 are secured to adjustable plates 226 which permit a pivotal adjustment of brushes 220 about shaft 205. The pivotal connection will permit vertical adjustment of brushes 220 with respect to the tire building drum A to permit adjustment of the stitching pressure between the sidewall of tread 45 and the carcass on which it is being applied.

A spring loaded stitching roller 127 (FIG. 20) is secured to the extreme end of beams 191 and 192 by suitable bracket means 228. Roller 227 is spring loaded downwardly to provide a relatively large stitching force to the thick, center portion of tread 45 as the tread is applied to a carcass on building drum A.

Referring to FIGS. 1 and 2, operation of the tread advancing and stitching means 4 is initiated by the arrival of drum carrier B adjacent the tread applicator. In a manner described in copending application Ser. No. 338,326 a signaling device S is set to actuate limit switch LS-4 which provides an electrical signal to the tread applicator to initiate the application of a tread to drum A. Solenoid valve SV-4 has actuating solenoids SV-4A and SV-4B which are employed to control the flow of pressurized fluid to opposite sides of power cylinder 183 (FIG. 13). Suitable conduits (not shown) interconnect solenoid valve SV-4 with power cylinder 183. The electrical signal provided by limit switch LS-4 results in energization of solenoid SV-4A to provide fluid to the left side of piston 183. This causes piston rod 184 to retract and lower gate 157 and beams 191 and 192 into their operative position. The counterclockwise movement of link 181 occasioned by the retraction of piston rod 184 moves this link out of contact with switch actuating pin 229, causing deactuation of limit switch LS-1 and preconditioning of the electrical system for further operations. The continued movement of link 181 in a counterclockwise direction brings the link into contact with actuating pin 230 of limit switch LS-5. This limit switch, when actuated, electrically signals the fact that gate 157 and beams 191 and 192 are in their down or operative position.

Solenoid SV-4B, which controls the flow of pressurized fluid to the right side of cylinder 183, as viewed in FIG. 13, is electrically controlled by limit switch LS-9 (FIG. 1) which has previously been described in the description of the tread centering means 3. As tread 45 moves out from under pin 152 during the application of the tread to tire building drum A, the pin returns to its position adjacent the upper surface of conveyor 16 and de-actuates limit switch LS-9. This initiates a time delay that determines the point in the process of tread application at which the gate 157 and beams 191 and 192 will be raised, removing stitching pressure from the tread. At the proper time, which is preferably such that about the last 10 inches of tread 45 will not be firmly stitched to the carcass, solenoid SV-4B is energized to deliver pressurized fluid to cylinder 183, thereby extending piston 184 and raising the gate and beams. The reason for having the trailing edge of tread 45 only lightly stitched to the carcass is that this portion of the tread requires realignment and repositioning at a subsequent station in the continuous tire building apparatus.

Referring now to FIGS. 1 to 3 and 23 to 26, the drum rotating means shown generally at 5 will be considered in detail, said drum rotating means being provided to impart clockwise rotational movement to drum A as viewed in FIG. 1, as a tread 45 is being applied thereto.

Drum rotating means 45 includes a support or pedestal, shown generally at 231 (FIG. 3), which comprises spaced vertical members 232 and 233, a top plate 234, a bottom plate 235, and gussets 236 (FIG. 1). Support 231 supports a sprocket engaging mechanism, shown generally at 237, on its top plate 234.

Sprocket engaging mechanism 237 includes a drive arm 238 (FIG. 24) which is bolted adjacent one of its ends to a flange 239 formed on a shaft 240. Shaft 240 is rotatably supported by bearings 241 and 242 in spaced vertical members 243 and 244, respectively, the vertical members being rigidly supported on a horizontal plate 245 fixed to top plate 234. The foregoing construction allows drive arm 238 to pivot relative to the vertical members 243 and 244 between a "lower," sprocket engaging position shown in FIG. 23, and an "upper," non-engaging position, shown in FIG. 26. Drive arm 238 is moved between its "upper" and "lower" positions by means of a pneumatically operated power cylinder 246 which is pivotally supported on a clevis 247 carried by vertical plate 243. A piston (not shown) operates within power cylinder 246 and is connected to one end of a piston rod 248. The other end of piston rod 248 carries a clevis 249 which is pivotally connected to a bracket 250 fastened to drive arm 238 (see FIG. 26). A solenoid valve SV-5 (FIG. 3), carried by top plate 234, is employed in controlling the flow of high pressure air through conduits (not shown) to power cylinder 246.

Referring to FIGS. 23 and 26, a limit switch LS-7, carried by a bracket 251 fastened to horizontal plate 245, is employed in signaling the electrical circuits of the tread applicator whether or not the drive arm is in the "upper" position. Limit switch LS-7 includes an operating arm 252 that is actuated by a tab 253 on drive arm 238 when the arm is in its upper position. Thus, when drive arm 238 is in its upper position as shown in FIG. 26, tab 253 forces arm 252 downwardly to indicate that the drive arm is in the upper position and, likewise, when the drive arm moves toward the lower position as seen in FIG. 23, contact between tab 253 and arm 252 will be removed and arm 252, which is spring biased, will rise to indicate that drive arm 238 is not in its upper position.

Referring to FIG. 24, shaft 240, in addition to carrying drive arm 238, supports first and second sprockets 255 and 256. Sprockets 255 and 256 are both bolted to a hub 257 which is rotatably supported on shaft 240 by means of bearings 258 and 259. Thus sprockets 255 and 256 may be rotated in unison independently of shaft 240 and drive arm 238. A third sprocket 260 (FIG. 25), is rotatably carried by drive arm 238 at its end remote from shaft 240. Sprockets 256 and 260 serve to support a relatively slack endless chain 261 which extends between the two sprockets and has an upper reach 261a and a lower reach 261b (FIG. 23). An idler sprocket 262 which is carried at one end of an arm 263 that is pivotally supported at its other end on drive arm 238, engages the upper reach 261a of chain 261. Idler sprocket 261 is biased downwardly by means of a tension spring 264 that is connected between a lug 265 fixed to arm 263 and a bracket 266 carried by arm 238.

As drive arm 238 moves to its lower position (shown in FIG. 23) the lower reach 261b of chain 261 engages the sprocket F of the drum carrier B to effect a driving connection therewith. Simultaneously, idler sprocket 262 rises relative to arm 238 to allow the slack in chain 261 to be taken up by the arcuate engagement of lower reach 261b with sprocket F. This insures that there will be a firm driving relationship between the chain and sprocket F. On the other hand, as drive arm 238 moves to its upper position (shown in FIG. 26) tension spring 264 moves idler sprocket 262 downwardly relative to arm 238 to take up the slack in chain 261 resulting from the disengagement of lower reach 261b from sprocket F.

A second limit switch LS-6 is mounted on top of vertical member 243 and has an actuating arm 267 positioned in the path of bracket 266 so that the downward movement of drive arm 238 will move bracket 266 upwardly and thus actuate limit switch LS-6 by the upward movement of actuating arm 267. The arm 267 is spring biased so that when bracket 266 moves out of contact therewith the arm will return to its inoperative or down position as seen in FIG. 26 to de-actuate limit switch LS-6. This limit switch is employed in signaling the electrical circuits of the tread applicator that the drive arm is in the down position in contact with sprocket F.

Referring to FIGS. 1 and 3, the rotary power for turning drum A is supplied by drive motor means 6 which will be described in greater detail below. Sprocket 255 is connected to said motor means by chain 268 which is driven by sprocket 269 secured to drive shaft 270. Drive shaft 270 is rotatably carried at one end by pedestal 231 and at its other end by support 271. Sprocket 272 imparts rotational movement to shaft 270 and is connected to the drive motor means by chain 273.

Referring to FIGS. 1, 3, 27, 28 and 29, a drive motor means shown generally at 6 is provided to supply continuous rotary power to the conveying means 1, tread advancing and stitching means 4, and drum rotating means 5. The motor is designated as MTR–1 and is equipped with a drive sprocket 277 that is connected by chain 278 to sprocket 279 on sprocket drive assembly 280.

Sprocket drive assembly shown generally at 280 in FIGS. 27, 28 and 29, comprises a support plate 281 which is mounted on frame 7 and carries spaced bearing blocks 282 and 283 that support drive shaft 284 on which sprocket 279 is secured. Shaft 284 provides a rotary input to an assembly comprising an electrically controlled magnetic clutch MC–1 and an electrically controlled magnetic brake MB–1, the rotary output of which appears on shaft 284a. Shaft 284a is supported by spaced bearings 285 and 286. One end of shaft 284a extends beyond bearing 286 and has conveyor belt drive sprocket 287 secured thereto.

Referring to FIG. 1, sprocket 287 is employed to provide rotary power to roller 21 that supports the downstream end of conveyor belt 16. Sprocket 288 is secured to shaft 22 that supports roller 21, said sprocket being driven by sprocket 287 through chain 289, sprocket 290, drive shaft 290a, a sprocket (not shown) and chain 291. An idler sprocket 292 is rotatably secured to frame 7 and engages chain 289 to maintain appropriate tension in the chain.

A second drive shaft 293 (FIG. 27) is supported on plate 281 substantially parallel to shaft 284a in bearings 294 and 295. Shaft 293 is driven by gears 296 and 297 secured to shafts 293 and 284a respectively. Sprocket 298 is secured to one end of shaft 293 and rotates therewith to supply rotary power to sprocket 200 (FIG. 1) secured to shaft 197 on the tread advancing and stitching means. Rotary power is delivered from sprocket 298 to sprocket 200 by chain 299, sprocket 300 secured to one end of shaft 301, a sprocket (not shown) secured to the other end of shaft 301, and chain 302. An idler sprocket 303 is secured to frame 7 and contacts chain 299 to maintain an appropriate tension in said chain.

Sprocket 306 is secured to the other end of shaft 293 and rotates therewith to supply rotary power to sprocket 255 on drum rotating means 5. Rotary power is delivered from sprocket 306 to sprocket 255 of the drum rotating means by the previously described drive which consists of chain 273, sprocket 272, drive shaft 270, sprocket 269 and chain 268.

The operation of sprocket drive assembly 280 is dependent upon the freedom of shaft 284a to be driven by sprocket 278. Since motor MTR–1 delivers continuous rotary power to sprocket 278, the ability of shaft 284a to rotate will depend upon the condition of electrically controlled magnetic clutch MC–1 and electrically controlled magnetic brake MB–1.

The operation of magnetic clutch MC–1 and magnetic brake MB–1 can best be explained by reference to the relative position of various parts of the tread applicator at a particular time. After a tread has been applied to building drum A and units 4 and 5 have moved to an inactive position, conveyor C is clear to move the next tire building drum into position in a manner described in copending application Ser. No. 338,326. At this point an operator places the next tread on the upstream end of conveyor belt 16 and, therefore, the conveyor must be operating in order to move the tread downstream. Magnetic clutch MC–1 is therefore energized and magnetic brake MB–1 is deenergized to permit free rotation of shaft 284a. As stated previously, in the operation of tread centering means 3, when the tread comes in contact with limit switch actuating pin 152, limit switch LS–9 will be actuated. The actuation of this limit switch electrically signals the electrical circuits of the tread applicator that the tread is positioned between the centering wheels of tread centering means 3. This electrical signal is transmitted to magnetic clutch MC–1 to de-energize said clutch and to magnetic brake MB–1 to energize said brake and thereby prevent further rotation of shaft 284a. Since shaft 284a controls the rotary power to all of the sprockets on the tread applicator, the halting of this shaft stops all sprockets. This condition remains until the new tire building drum moves into position in front of the tread applicator, the tread advancing and stitching means moves downwardly into an operative position, and the drum rotating means moves into contact with sprocket F. When the last of these actions occurs, limit switch LS–6 is actuated by the downward movement of drive arm 238 to initiate an electrical signal. This signal is transmitted to magnetic brake MB–1 to deenergize this brake and to magnetic clutch MMC–1 to energize this clutch to thereby couple shaft 284a to shaft 284 for rotational movement therewith. The clutch and brake thereafter remain in this condition to provide rotary power for the sprocket drive assembly until another tread comes in contact with limit switch LS–9.

From the foregoing description it will be apparent that the present invention provides a new and improved apparatus for laterally aligning a tread on a conveyor prior to the application of the tread to a tire building drum. Furthermore, the apparatus is uncomplicated in construction and yields extremely accurate results.

While there has been described what is at present considered to be the preferred embodiment of this invention, it will be obvious to those skilled in the art that various changes and modifications may be made therein without departing from the invention, and it is therefore aimed to cover all such changes and modifications as fall within the true spirit and scope of the invention.

Having thus described my invention, what I claim and desire to protect by Letters Patent is:

1. Apparatus for accurately applying a tread to a rotatably mounted tire building drum, comprising: an endless conveyor belt for delivering said tread to a point adjacent said drum, said belt having a series of spaced apertures along the approximate longitudinal center line thereof; means for directing a blast of pressurized air upwardly through said apertures against the underside of said tread to thereby support a portion of said tread above said belt; and aligning means mounted above said belt and engageable with said tread for moving said tread into transverse alignment with said drum.

2. Apparatus for accurately applying a tread to a rotatably mounted tire building drum, comprising: a frame; an endless conveyor belt supported by said frame for delivering said tread to a point adjacent said drum, said belt having a series of spaced apertures extending longitudinally thereof; a transversely extending plate on said frame for supporting a portion of the upper level of said belt, said plate having spaced perforations therethrough extending longitudinally thereof in alignment with said belt apertures; an air chamber secured to the underside of said plate in register with said perforations; conduit means interconnecting said chamber with a source of pressurized air, whereby said air may be caused to flow through said perforations and said apertures to support a portion of said tread to thereby reduce the frictional contact between said tread and said belt; and aligning means mounted above said belt and engageable with said tread for moving said tread into transverse alignment with said drum.

3. The apparatus of claim 2 wherein said apertures extend along the approximate center line of said belt.

4. Apparatus for accurately applying a tread to a rotatably mounted tire building drum, comprising: an endless conveyor belt for delivering said tread to a point adjacent said drum; an air cushion for supporting a portion of said tread above said belt to thereby reduce the surface contact between said tread and said belt; and aligning means mounted above said belt and engageable with said tread for moving said tread into transverse alignment with said drum.

5. In a method for accurately applying a tread to a rotatably mounted tire building drum, the steps of: delivering a tread on an endless conveyor belt to a point adjacent said drum; directing a blast of pressurized air against the surface of said tread in contact with said belt to support a portion of said tread above said belt to reduce the frictional contact between said tread and said belt; and moving said tread into transverse alignment with said drum while said portion is so supported.

References Cited

UNITED STATES PATENTS

| | | | |
|---|---|---|---|
| 1,624,272 | 4/1927 | Morris | 156—405 |
| 1,944,389 | 1/1934 | Abbott | 156—406 X |
| 2,346,439 | 4/1944 | Lequillon | 156—405 |
| 2,918,105 | 12/1959 | Harris | 156—406 X |
| 3,014,831 | 12/1961 | Nebout | 156—406 |

EARL M. BERGERT, *Primary Examiner.*

C. B. COSBY, *Assistant Examiner.*